(12) United States Patent
Bilanin et al.

(10) Patent No.: US 7,798,448 B2
(45) Date of Patent: Sep. 21, 2010

(54) FLOW-DRIVEN OSCILLATING ACOUSTIC ATTENUATOR

(75) Inventors: Alan J. Bilanin, Princeton, NJ (US); Todd R. Quackenbush, Ringoes, NJ (US); Pavel V. Danilov, Ewing, NJ (US)

(73) Assignee: Continuum Dynamics, Inc., Ewing, NJ (US)

( * ) Notice: Subject to any disclaimer, the term of this patent is extended or adjusted under 35 U.S.C. 154(b) by 268 days.

(21) Appl. No.: 12/008,134

(22) Filed: Jan. 9, 2008

(65) Prior Publication Data

US 2009/0045289 A1 Feb. 19, 2009

Related U.S. Application Data

(60) Provisional application No. 60/879,545, filed on Jan. 10, 2007.

(51) Int. Cl.
*B64C 23/06* (2006.01)
(52) U.S. Cl. ...................... 244/130; 244/201
(58) Field of Classification Search ............. 244/130, 244/200.1, 201, 203, 204, 206, 1 N
See application file for complete search history.

(56) References Cited

U.S. PATENT DOCUMENTS

| | | | |
|---|---|---|---|
| 5,340,054 A * | 8/1994 | Smith et al. ............. 244/1 N |
| 5,699,981 A | 12/1997 | McGrath et al. | |
| 5,818,947 A | 10/1998 | Cattafesta, III et al. | |
| 6,098,925 A | 8/2000 | Burdsall, II et al. | |
| 6,123,296 A * | 9/2000 | Mangalam ............. 244/204 |
| 6,296,202 B1 | 10/2001 | Stanek | |
| 6,446,904 B1 | 9/2002 | Stanek | |
| 6,739,554 B1 | 5/2004 | Stanek | |
| 7,213,788 B1 | 5/2007 | Alvi et al. | |

OTHER PUBLICATIONS

Bilanin, Alan J.,"Flow Driven Oscillating Vortex Generators for Flow Control of Boundary Layer Dynamics," Proposal No. A7.01-9688 (SBIR Phase I proposal), May 29, 2001.
Bilanin, Alan J., et al.,"Flow Driven Oscillating Vortex Generators for Flow Control of Boundary Layer Dynamics," SBIR Phase I Final Report to NASA Contract NAS1-02103, May 2002.

(Continued)

*Primary Examiner*—Timothy D Collins
(74) *Attorney, Agent, or Firm*—David M. Quinlan, P.C.

(57) ABSTRACT

An apparatus for attenuating acoustic resonance generated by flow over a cavity in a surface comprises a plurality of flat flaps proximate to an upstream edge of the cavity. The flaps are disposed in an array spaced in a width direction of the cavity edge, and are oscillated by the flow in two degrees of freedom solely by the flow, independent of an actuation mechanism. Each flap includes a first hinge generally coextensive with the surface for enabling oscillation in a first degree of freedom and a second hinge orthogonal to the first hinge and forming a tab for enabling oscillation in a second degree of freedom. The hinges are constructed with torsional spring constants that provide predetermined oscillation frequencies and magnitudes. The apparatus can include a deployment mechanism for moving each flap between a stowed position wherein it is generally flush with the surface and a deployed position wherein the flap can be oscillated by the flow.

12 Claims, 10 Drawing Sheets

OTHER PUBLICATIONS

Kook, H., et al., "Active Control of Pressure Fluctuations Due to Flow Over Helmoltz Resonators," Journal of Sound and Vibration, vol. 255, No. 1 (2002), pp. 61-76.

Bilanin, Alan J.,"Flow Driven Oscillating Vortex Generators for Flow Control of Boundary Layer Dynamics," Proposal No. 01-II A7.01-9688 (SBIR Phase II proposal), May 2, 2002.

Cattafesta, Louis, et al., "Review of Active Control of Flow-Induced Cavity Resonance," 33rd AIAA Fluid Dynamics Conference, Jun. 23-26, 2003, Orlando, Fl., pp. 1-17.

Quakenbush, Todd, R.,"Flow Driven Oscillation Vortex Generators for Control of Boundary Layer Dynamics," SBIR Phase II Final Report to NASA, Contract NAS1-02105, Sep. 2005.

* cited by examiner

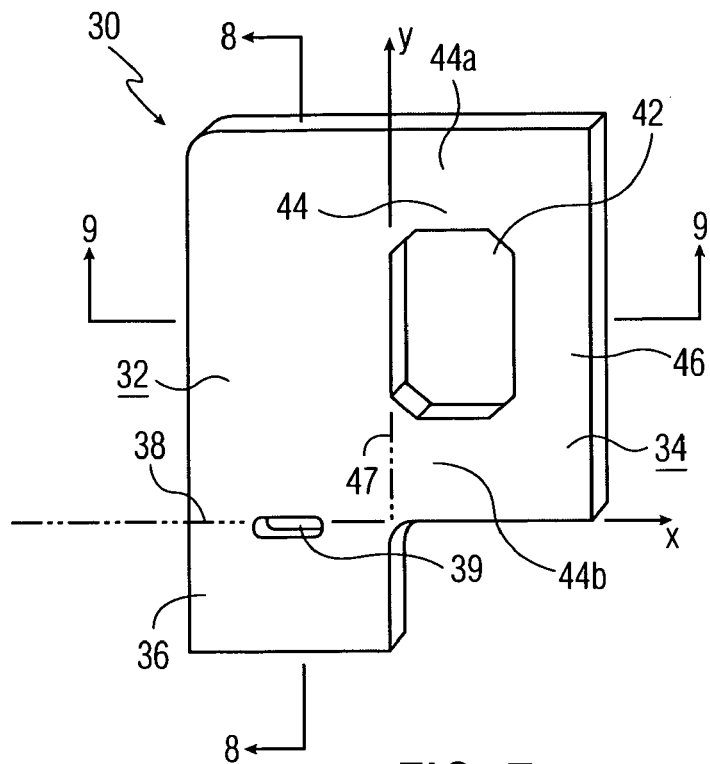
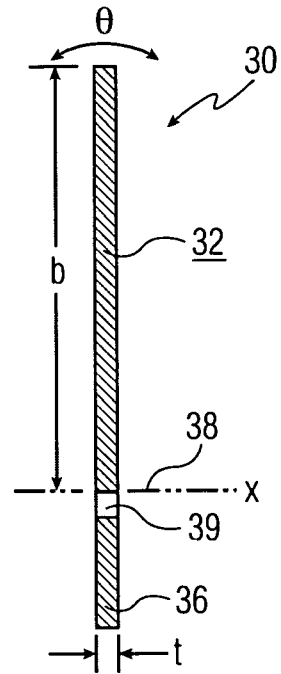
FIG. 7     FIG. 8
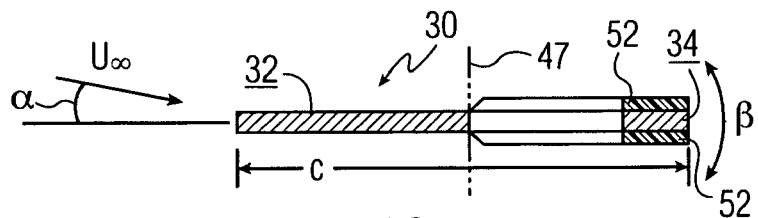
FIG. 9
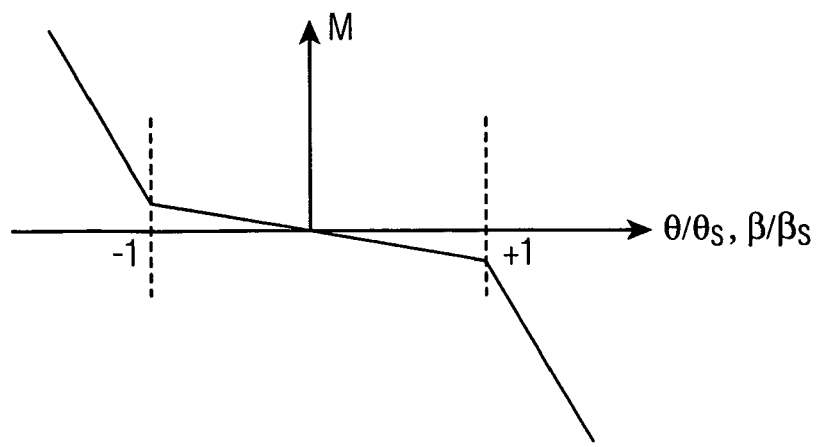
FIG.10

FLOW-DRIVEN OSCILLATING ACOUSTIC ATTENUATOR

CROSS-REFERENCE TO RELATED APPLICATIONS

This application claims the benefit of U.S. provisional application No. 60/879,545, filed Jan. 10, 2007, the contents of which are incorporated herein by reference.

BACKGROUND OF THE INVENTION

1. Field of the Invention

The present invention relates to an apparatus and method for attenuating acoustic energy in a fluid flow, and more particularly, to apparatus and methods for mitigating the acoustic energy in the flow over a cavity.

2. Description of Related Art

The problems caused by acoustic resonance associated with flow over a cavity have been studied for at least 50 years. The issue arises when fluid flowing over a more or less continuous surface encounters a cavity in the surface, which creates a large amount of acoustic energy. This situation occurs in contexts ranging from landing gear wells and weapons bays in airplanes, to gas transport and piping systems, to sunroofs in automobiles. This type of cavity flow not only creates high noise levels but also generates severe vibrational stresses. Failing to mitigate cavity resonance increases operational noise levels and can lead to fatigue-induced structural damage. In aircraft weapons bays, the pressure waves associated with the acoustic energy can also interfere with accurate delivery of weapons such as missiles and so-called "smart bombs."

FIG. 1 illustrates schematically the fluid flow over a cavity, the physics of which have been described in various publications. See, for example, Cattafesta, Louis, et al., "Review of Active Control of Flow-Induced Cavity Resonance," $33^{rd}$ AIAA Fluid Dynamics Conference, Jun. 23-26, 2003, Orlando, Fla., AIAA 2003-3567 ("the Cattafesta article"), from which FIG. 1 is taken. When flow over a smooth surface SS, such as an aircraft fuselage, encounters a cavity CA (representing, say, a landing gear well), a fluid boundary layer BL with a thickness δ separates at the leading edge LE of the cavity. This creates a shear layer SL between the free-stream flow $U_\infty$ above the cavity and the slower flow inside the cavity. The shear layer, which is an unstable, turbulent flow region, reattaches to the surface SS near the cavity trailing edge TE. The region where the shear layer SL impinges at the trailing edge LE plays an important role in the overall acoustic response of the flow regime, in that small disturbances of the shear layer around the trailing edge induce significant mass flux into and out of the cavity. Acoustic waves feed back from the trailing edge TE to the leading edge LE inside the cavity (arrow FB), and outside the cavity as well if $U_\infty$ is subsonic, which reinforces the acoustic resonance in the cavity. The interaction of the acoustic waves with the shear layer SL causes vortices VX to form in the shear layer SL. These vortices impact at the trailing edge TE of the cavity and can reinforce the acoustic energy generated by the flow over the cavity. The role of the vortices VX in the flow system is also discussed in Kook, H., et al., "Active Control of Pressure Fluctuations Due to Flow Over Helmholtz Resonators," *Journal of Sound and Vibration*, Vol. 255, No. 1 (2002), pp. 61-76 ("the Kook article").

If the acoustic energy generated by this type of cavity flow has frequencies that resonate with natural resonance frequencies of the cavity, it will increase the amplitude of the acoustic disturbances. All told, the resulting dynamic loads created by the cavity can reach 160 dB or higher. Mathematical models have been developed for these kinds of flows, and many of the available models have shown good agreement with experiments. This has enabled the development of various devices and systems to mitigate the acoustic energy generated by the flow over the cavity.

The Cattafesta article surveys a number of such devices, separating them into active and passive flow control systems. Active control systems input external energy, such as mechanical or electrical energy, into the flow, while passive controls do not rely on external energy sources. Generally, interest has focused on three types of devices: (1) zero-frequency passive, stationary devices, such as spoilers, fences, ramps, etc., (2) low-frequency active devices, such pulsed blowing devices, and (3) high-frequency active devices, including splash jets, powered resonance tubes, and the like. The Cattafesta article also describes passive control systems that extract energy from the flow itself, such as unpowered resonance tubes and cylinders and rods situated in the boundary layer near the cavity leading edge, as well as a number of active control systems using open-loop and closed-loop feedback control. In addition to the devices and systems discussed in the Cattafesta article, devices and systems aimed at reducing sound pressure levels caused by flow over an open cavity are discussed in U.S. Pat. Nos. 5,818,947, 5,699,981, 6,098,925, 6,296,202, 6,446,904, 6,739,554, and 7,213,788, and in the Kook article.

The majority of known devices are intended to disrupt the formation of the shear layer at the cavity leading edge, with the object of breaking the coupling between the acoustic waves and the free shear layer. Drawbacks of known passive devices include a limited operating range, meaning that they are only effective through a relatively narrow range of flow conditions. As for active systems, they require an actuation system, which can be bulky and difficult to implement in flow environments encountered in aircraft applications. They can also require a significant amount of energy to operate and entail a weight penalty, both of which can be important considerations in aircraft applications especially.

In spite of the drawbacks in implementing known systems, many have proven successful in reducing sound pressure levels, and in the process have revealed interesting properties of cavity resonance mitigation. For one, there are particular forcing frequencies for given open-loop control systems (in which the device is forced without regard to the actual flow in the cavity) that can lead to significant sound reduction. Other systems have shown that actuation amplitude above a certain magnitude does not significantly affect the flow. For example, a system employing a vibrating cylinder ahead of the cavity generally does not reduce sound pressure levels at magnitudes of vibration greater than about 5% of the cylinder diameter.

One known type of active resonance mitigation system uses flaps at the leading edge of the cavity. Two examples of such systems are described in the Kook article and in U.S. Pat. No. 5,818,947. These can be open-loop or closed-loop systems, but they employ actuators to move the flaps. Since these are active devices, they require actuators that can move the flaps through the required range of motion (amplitude), and such actuators carry significant, usually unacceptable, weight and power penalties. The same problem is encountered with pulsed jet devices, namely that generating sufficient mass fluxes to affect the flow in the cavity generally requires an unacceptable level of external power.

SUMMARY OF THE INVENTION

It is an object of the present invention to use flow-driven oscillating acoustic attenuators to reduce sound pressure levels generated by the flow over a cavity.

In accordance with a first aspect of the invention, apparatus for attenuating acoustic resonance generated by flow over a surface with a cavity therein comprises a plurality of flaps proximate to the cavity at an edge thereof upstream in the direction of the flow, the flaps being disposed in an array spaced in a width direction of the upstream edge, and a mounting arrangement for mounting each flap for oscillation relative to the flow, wherein the oscillation of each flap is driven solely by the flow independent of an actuation mechanism.

In one embodiment of the invention, each flap is a flat sheet mounted at an angle $\phi=10°$ to $90°$ relative to the surface and at an angle of attack $\alpha=-20°$ to $+20°$ relative to the direction of the flow over the surface, and in a more preferred embodiment $\phi$ is between $20°$ to $45°$, with a between $-5°$ and $+5°$, and more preferably equal to $0°$.

In accordance with another aspect of the invention, each said flap includes a first hinge generally coextensive with the surface for enabling oscillation in a first degree of freedom and a second hinge orthogonal to the first hinge and forming a tab for enabling oscillation in a second degree of freedom.

In accordance with still another aspect of the invention, apparatus for attenuating acoustic resonance generated by flow over a surface with a cavity therein comprises a plurality of flat flaps proximate to the cavity at an edge thereof upstream in the direction of the flow, the flaps being disposed in an array spaced in a width direction of the upstream edge, a mounting arrangement for mounting each flap for oscillation relative to the flow, wherein the oscillation of each flap is driven solely by the flow independent of an actuation mechanism, and a deployment mechanism for moving each flap between a stowed position wherein the flap is generally flush with the surface and a deployed position wherein each said flap is disposed at a position for oscillation by the flow.

In accordance with yet another aspect of the invention, each said flap in the deployed position is oriented at an angle of attack $\alpha=-5°$ to $+5°$ relative to the direction of the flow over the surface and at an angle $\phi=10°$ to $90°$ relative to said surface, and includes a first hinge generally coextensive with the surface when in the deployed position and enabling oscillation in a first degree of freedom, and a second hinge orthogonal to the first hinge and forming a tab for enabling oscillation in a second degree of freedom, and each of the first and second hinges has at least one predetermined torsional spring constant for a given range of angular deformation to provide a desired magnitude and frequency of oscillation when the flap is driven by the flow.

In a broad aspect of the present invention, an apparatus for attenuating acoustic resonance generated by flow over a surface comprises at least one flap disposed for presenting a leading edge to the flow, and a mounting arrangement for mounting the flap for oscillation transverse to the direction of the flow, wherein the oscillation of the flap is driven solely by the flow independent of an actuation mechanism.

BRIEF DESCRIPTION OF THE DRAWINGS

The objects of the invention will be better understood from the detailed description of its preferred embodiments which follows below, when taken in conjunction with the accompanying drawings, in which like numerals and letters refer to like features throughout. The following is a brief identification of the drawing figures used in the accompanying detailed description.

FIG. 7 is an enlarged perspective view of one form of a flap that can be used in the embodiment of the invention depicted in FIGS. 4-6, illustrating the hinged main portion and hinged tab portion thereof that facilitate oscillation of the flap in two degrees of freedom.

FIG. 8 is a cross-sectional view taken along lines 8-8 in FIG. 7.

FIG. 9 is a cross-sectional view taken along lines 9-9 in FIG. 7.

FIG. 10 plots the spring moment M as a function of normalized angular deflections $\theta/\theta_S$ and $\beta/\beta_S$ for a vortex generator modeled with two torsion-spring hinges providing two degrees of freedom of angular oscillation ($\theta$ and $\beta$).

One skilled in the art will readily understand that the drawings are not strictly to scale, but nevertheless will find them sufficient, when taken with the detailed descriptions of preferred embodiments that follow, to make and use the present invention.

DETAILED DESCRIPTION OF PREFERRED EMBODIMENTS

General Principles Underlying the Invention

It has long been known that under certain conditions aerodynamic systems such as wings and control surfaces will undergo limit cycle oscillation (LCO). Under such conditions, the energy required to maintain the LCO motion is being extracted from the surrounding flow field. For dynamic systems this is a special form of "flutter" where the energy extracted from the flow field is exactly equal to energy lost to structural, aerodynamic, and other forms of damping. There has been a great deal of research over the years to develop methods for accurate prediction of the onset of LCO and flutter, in furtherance of the usual design approach of predicting the onset of flutter using available computational techniques, and then, if necessary, redesigning the system to avoid creating conditions where it will exist.

In contrast, the present invention seeks not to avoid such oscillations, but to use them to power vortex generators and cause them to undergo a natural limit cycle oscillation at a prescribed flow speed and oscillatory amplitude and frequency. The flow characteristics of the vortices generated are chosen with relation to resonance frequencies of cavities in the path of the flow, so as to attenuate the acoustic energy caused by such flow. In other words, the present invention uses the LCO phenomena as a self-actuating mechanism for driving the vortex generators, thereby to produce variations in vorticity trailing the generators to provide a beneficial effect on acoustic resonance in a cavity. Through aeroelastic tuning of the vortex generators, they can be designed to oscillate (undergo LCO motion) at a specified frequency and speed. The amplitude (which is limited in a manner that makes extended LCO motion possible) and frequency characteristics of the LCO phenomenon can be tailored through the number of system degrees of freedom, choice of section properties, combinations of construction materials, variation of root attachment mechanisms, and other approaches that will be apparent to those skilled in the art from the description herein.

Figure 1:
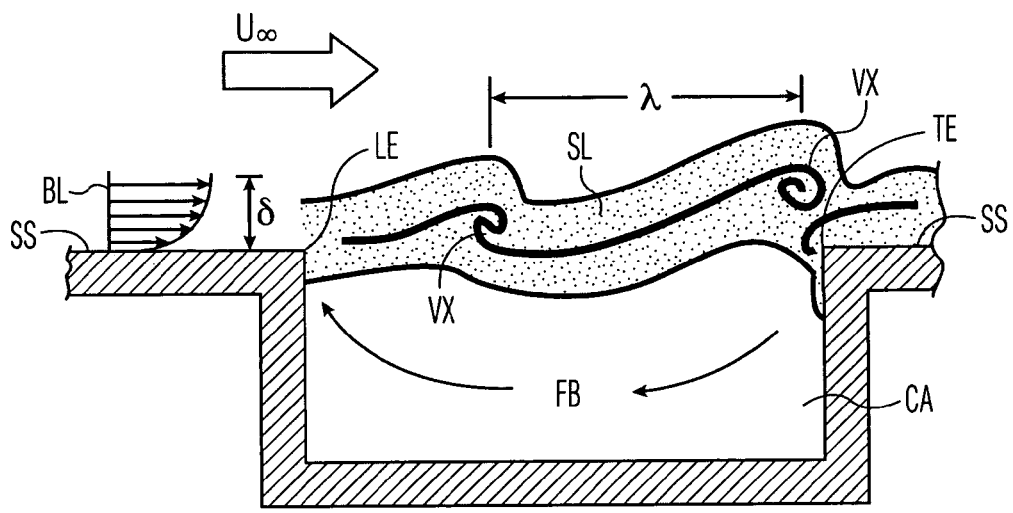
FIG. 1 is a schematic depiction of the flow over a cavity in a continuous surface.
Figure 2:
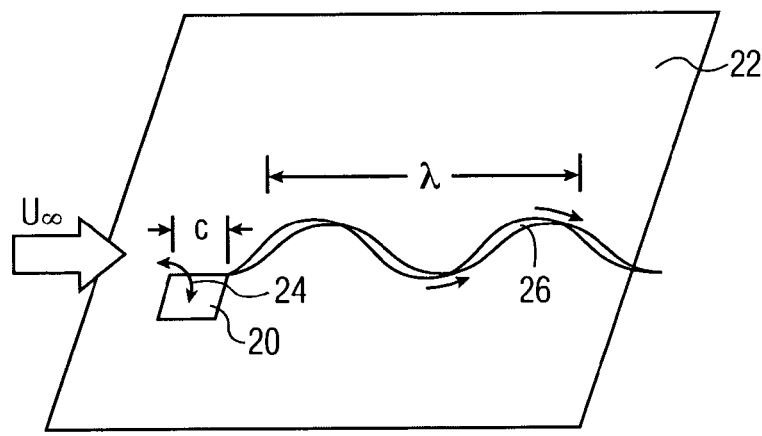
FIG. 2 is a schematic perspective view of a self-excited, flow-driven flexible flap that illustrates a principle underlying the present invention.

FIG. 2 is a schematic perspective view of an embodiment of a flow-driven oscillating vortex generating structure that illustrates certain principles underlying the present invention. In this embodiment, the vortex generator is a flap 20 upstanding from a surface 22 in a fluid flow denoted by the arrow $U_\infty$. In this illustration the flap 20 is perpendicular to the surface 22, but as is described below, the invention is not limited to that configuration. By orienting the flap 20 in a particular manner to the oncoming fluid flow, and choosing the flap's mechanical properties, dimensions, and the manner in which it is attached to its supporting structure, it can be made to oscillate under given flow conditions. The flap 20 is designed to oscillate in the direction of the arrow 24. This oscillation introduces periodic, streamwise vortex structures, represented notionally at 26, into the flow trailing the flap 20. These vortex structures have a wavelength λ that is relatively long compared to the chord c of the flap, such that μ/c is on the order of 10 to 100, meaning that it has a value from about 10 to about 100. (Hereafter "on the order of x" will be written "O(x).")

Figure 3:
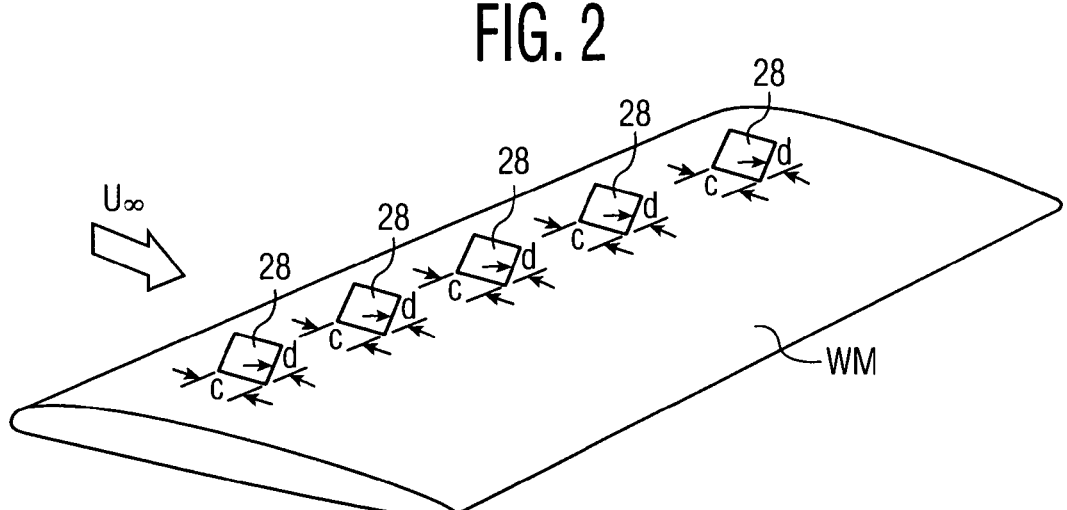
FIG. 3 depicts a plurality of flexible flaps mounted on the top surface of a wing in experiments by the inventors that proved the efficacy of controlling fluid flows using flow-driven oscillating vortex generators.

Prior experiments by the inventors showed the efficacy of controlling fluid flows using flow-driven oscillating vortex generators. FIG. 3 is a schematic depiction of the device tested in these experiments. A plurality of flaps 28 were attached to the top surface of a model of a wing WM as shown in FIG. 3. If the flaps were installed on an airplane wing, they could be maintained flush with the wing during cruise conditions and deployed as shown in FIG. 3 to protrude into the flow over the wing at a desired deployment angle d. The flaps were configured to oscillate when deployed, in the manner discussed-above in connection with FIG. 2. Wind tunnel experiments were conducted in which the flow separated from the wing surface at a wing angle of attack of 16° and free-stream velocity $U_\infty$=85 ft./sec. When the flaps were deployed at an angle d=45° from the wing surface, the flow remained attached at the same wing angle of attack. In general, the tests showed that the flow-driven oscillating flaps permitted a 5° increase in the wing angle of attack before stall. These experiments are reported in Quackenbush, T. R., Bilanin, A. J., Danilov, P. V., and Whitehouse, G. R., "Flow Driven Oscillating Vortex Generators for Control of Boundary Layer Dynamics," SBIR Phase II Final Report to NASA under Contract NAS 1-02105, September 2005.

Specific Embodiments of the Invention

Figure 4:
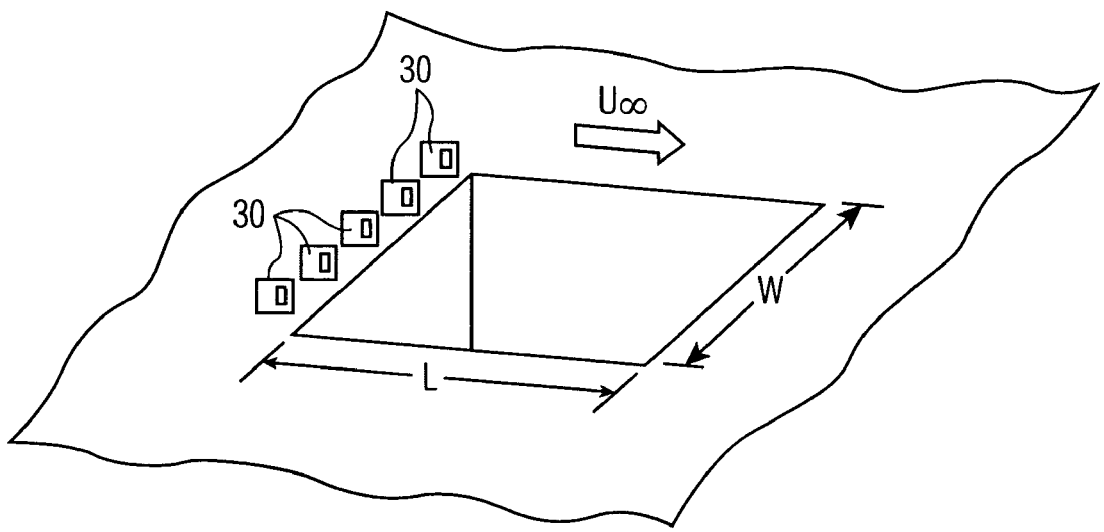
FIG. 4 is a perspective view of an array of flaps deployed as flow-driven oscillating acoustic attenuators in accordance with an embodiment of the invention to reduce sound pressure levels generated by the flow over a cavity.
Figure 5:
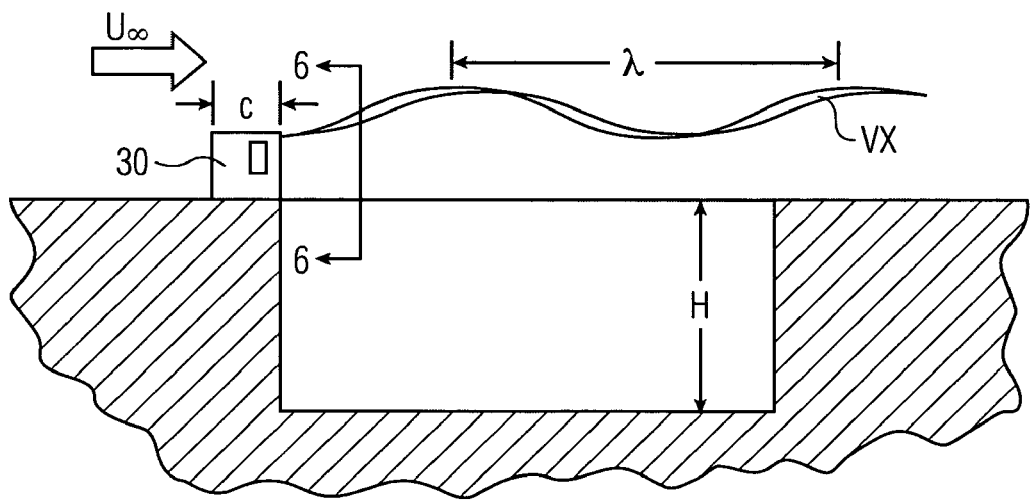
FIG. 5 is a cross-sectional view of the embodiment shown in FIG. 4, taken in the flow direction.
Figure 6:
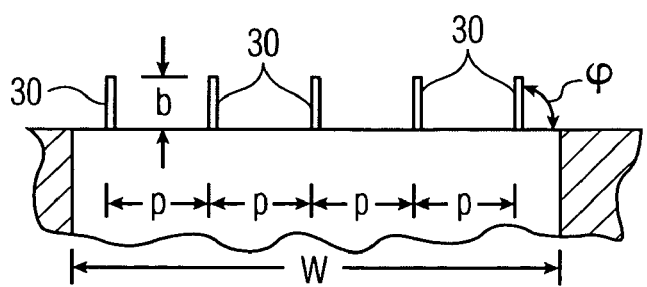
FIG. 6 is a cross-sectional view of the embodiment shown in FIG. 4, taken transverse to the flow direction.

FIG. 4 is perspective view of an embodiment of the present invention in which an array of flaps 30 installed relative to a cavity to provide flow-driven oscillating acoustic attenuators to reduce sound pressure levels generated by the free-stream flow $U_\infty$ over the cavity in the direction indicated in FIG. 4. As seen in FIG. 5, which is a cross-sectional view of the present embodiment taken in the flow direction, the cavity has a length L in the flow direction and a depth H. FIG. 6, which is a cross-sectional view taken transverse to the flow direction, shows the cavity width W. As discussed above, the cavity can be, for example, a weapons bay or landing gear well in an aircraft, in which case the surface surrounding the cavity in FIG. 6 represents the fuselage of the aircraft. FIG. 5 includes a notional depiction of the periodic vortex structures 26, with wavelength λ (see FIG. 2), generated by the flaps 30.

Each flap 30 is a thin, flat plate attached to the surface upstream of the cavity, with a chord length c (the distance between its leading and trailing edges) and a height b (from the surface to the tip of the flap). The flap is oriented at angle of attack a relative to the free-stream flow $U_\infty$ (see FIG. 9) preferably between −20° and +20°, and more preferably between −5° and +5°. The inventors anticipate that further testing of the invention will reveal that the most preferred angle of attack is 0°. The flaps 30 are arrayed across the width W of the cavity at a pitch p and are deployed at a deployment angle q) relative to the surface. The pitch p is preferably less than 4.0b, and more preferably between 1.0b and 3.0b. The deployment angle ϕ can be any angle between 0° and 90°, but is preferably between 20° and 45°. (FIGS. 4-6 depict the flap at a deployment angle ϕ=90° for ease of illustration.) As indicated above, optimum acoustic resonance control is achieved when μ/c=O(10-100).

A preferred embodiment of the flaps 30 is shown in more detail in FIG. 7, which is an enlarged perspective side view of one of the flaps 30, FIG. 8, which is a cross-sectional view taken along lines 8-8 in FIG. 7, and FIG. 9, which is a cross-section taken along lines 9-9 in FIG. 7. In this embodiment, the flap 30 has a main portion 32 and a tab portion 34. The flap also includes a root 36 that attaches to a deploying mechanism, described below in connection with FIGS. 16 and 17, so that the flap 30 extends above the surface surrounding the cavity when deployed. The flap includes a first hinge 38 that is provided by a first cutout 39 separating the main portion 32 from the flap root 36. The resulting hinge 38 permits the entire flap 30 to deflect angularly relative to the root 36 in a predetermined manner as discussed below. The flap 30 also includes a second cut-out 42 that defines the tab portion 34. As a result, the tab portion includes a hinge portion 44, with top and bottom portions 44a and 44b, and a trailing portion 46. The hinge portion 44 provides a second hinge 47 that permits the tab portion 34 to deflect angularly relative to the main portion 32 in a predetermined manner (see below). The tab 34 thus deflects in a plane that is generally perpendicular to the main portion 32.

This flap construction is most advantageously realized by using a single piece of sheet metal made of spring steel, with a thickness t determined by the desired operational properties discussed below. It is anticipated from testing performed up to now that the preferred value of t will be between 0.003" and 0.020" for flaps made of spring steel. The oscillatory properties of the trailing tab 34 can be further tailored by adding mass thereto, shown in the present embodiment in the form of a neoprene coating 52 on either side of the tab portion, as best seen in FIG. 9. (The neoprene coating is omitted from FIG. 7 for ease of illustration.) The neoprene coating can be applied by laminating a neoprene sheet of the desired thickness to the flap using a suitable adhesive.

For most applications the overall dimensions of the flap are on the order of b=1" to 3" and c=1" to 3". The first cutout 39 is sized to promote flexure at the juncture between the main flap portion 34 and the root 36. In many applications, the first cutout can be omitted since the flap will tend to flex naturally at that location. Those skilled in the art will be able to apply the principles discussed herein to determine if a first cutout is needed in a given application, and if so, the size thereof that is required for the desired operation characteristics. The second cut-out 42 will most advantageously be about 0.3" to 1.0" in the height direction of the flap and about 0.15" to 0.5" in the orthogonal direction, although its size will also be determined largely in view of the operational principles discussed herein. It will be appreciated by those skilled in the art, however, that the invention is not limited to the use of any particular material or any particular hinge configuration. Other materials, such as composites or moldable plastics, and other hinge configurations, capable of operating as discussed herein, are also within the scope of the invention. In all cases, the materials, construction, configuration, and method of manufacturing the flap or any other form of flow-driven vortex generator of the invention will be chosen in accordance with the operating principles discussed herein, and the invention covers all such configurations.

In operation, the motion of the flap 30 in a fluid flow is initiated in a manner consistent with a statically divergent system. Taking oscillation about the hinge 38 as an example, the chordwise position of the elastic axis of the flap is behind the aerodynamic center of pressure when the flap in the rest position. Once a critical flow speed is exceeded, any perturbation in the onset flow will cause the flap to initiate motion in a direction perpendicular to the onset flow. This motion corresponds to the development of non-zero values of the deflection angle $\theta$ and is perceived at each cross-section of the flap as the appearance of a nonzero heave velocity. As this motion progresses, the spring rates of the hinge/flap combination (discussed below) are designed to move the elastic axis to a chordwise position forward of the aerodynamic center of pressure, stabilizing the system and reversing the direction of motion. This characteristic behavior reverses itself as the flap passes back through its rest position and develops motion in the opposite direction. Thus, the LCO motion is maintained through the movement of the flap's elastic axis. Furthermore, the frequency and amplitude of motion is governed by the relationship between the moment of inertia of the flap, the aerodynamic forces, and the hinge spring rates. With careful selection of the flap/hinge spring rates and the flap's mass distribution, the flap can be designed to undergo LCO motion at a prescribed amplitude and frequency Mathematically Modeling the Invention's Operative Characteristics The presence of the first and second hinges as discussed above promotes oscillation of the flap 30 in two degrees of freedom about the respective x- and y-axes shown in FIG. 7. The characteristics of this implementation of the invention can be understood by modeling the oscillatory motion of the flap as flexure about two torsion-spring hinges. In that regard, the flap vortex generator embodiment of the invention can in a general case be considered as undergoing a combination of:

(1) angular displacement $\theta$ of one portion such as the main flap portion 32 about an x-axis (FIG. 7) at a first torsional spring rate $K_{f1}$ and a second torsional spring rate $K_{f2}$, and (2) angular displacement $\beta$ of another portion such as the trailing tab 34 about a y-axis (FIG. 7) at a first torsional spring rate $K_{t1}$ and a second torsional spring rate $K_{t2}$. (Note that the origin of the y-axis is at the plane of the surface surrounding the cavity, and the origin of the x-axis is where the two hinge portions 44a and 44b join the main portion 32.)

It is important to understand that the invention encompasses a flap without specific structure that performs as a hinge or hinges at one or more discrete locations. However, a flap embodiment with such structure is advantageous because it permits large amplitude motion in the orthogonal x- and y-directions without large structural deformations. Using hinges to provide two-degree of freedom oscillation also allows the spring rates of the hinge/flap combinations to be more readily controlled by selection of the location and structure of the hinge(s).

The hinged-flap embodiment of the invention is likewise not limited to any particular hinge structure or configuration. The general modeling approach described above assumes hinges each having two spring rates depending on the amount of deflection of the respective hinge. (It is also possible to have hinges each with more or fewer different spring rates depending on the amount of angular deflection.) This particular model of the flap yields FIG. 10's plot of the spring moment M vs. normalized deflection $\theta/\theta_S$ and $\beta/\beta_S$ ($\theta_S$ and $\beta_S$ being the values of $\theta$ and $\beta$ where the spring rate changes). The spring moments M in FIG. 10 for the different angular displacement regions are given by the following relations:

$$M_S = K_{f2}(\theta - \theta_S) \text{ for } \theta > +\theta_s$$

$$M_S = K_{f1}\theta \text{ for } -\theta_S < \theta < +\theta_S$$

$$M_S = K_{f2}(\theta + \theta_S) \text{ for } \theta < -\theta_S$$

and $$M_S = K_{t2}(\beta - \beta_S) \text{ for } \beta > +\beta_S$$

$$M_S = K_{t1}\beta \text{ for } -\beta_S < \beta < +\beta_S$$

$$M_S = K_{t2}(\beta + \beta_S) \text{ for } \beta < -\beta_S$$

Assuming rigid body dynamics for both the main portion and tab portion of the flap, this dynamic system can be modeled by the following set of coupled differential equations for the flap (that is, the main portion) and the tab, respectively:

$$I_{xx}\ddot{\theta} - I_{xy}\ddot{\beta} + \left[\frac{1}{6}\rho U^2 R^3 C_{l\alpha} + I_{xx}\gamma_1\right]\dot{\theta} -$$

$$I_{xy}\gamma_2\dot{\beta} + [K_{f1} + K_{f2}g(\theta, \theta_s)]\theta - \frac{1}{4}\rho U^2 cR^2 C_{l\beta}\beta = 0$$

and $$I_{yy}\ddot{\beta} - I_{xy}\ddot{\theta} + I_{yy}\gamma_2\dot{\beta} + \left[\frac{1}{4}\rho U^2 cR^2\left(C_{mt\alpha} + \frac{x_H}{c}C_{lt\alpha}\right) - I_{xy}\gamma_1\right]\dot{\theta} +$$

$$\left[K_{t1} + K_{t2}g(\beta, \beta_s) - \frac{1}{2}\rho U^2 c^2 R\left(C_{mt\beta} + \frac{x_H}{c}C_{lt\beta}\right)\right]\beta = 0$$

where function g(x,y) is defined as follows:

$$g(x, y) = \frac{|x| - y}{|x|} \quad \text{if } |x| > y$$

and $$g(x, y) = 0 \quad \text{if } |x| < y$$

It should be understood that the flap embodiment shown in FIGS. 7-9 is a special case of the model shown in FIG. 10. In this embodiment, each hinge has the same torsional spring rate throughout its entire rotational range. This means that $\theta_S = \beta_S = 0$ (and the abscissa in FIG. 10 would be $\theta$, $\beta$). The result is that in the coupled differential equations above, $g(x,y)=1$ for all values of $\theta$ and $\beta$.

The flap aerodynamics are modeled assuming quasi-steady flow and thin airfoil theory. $C_{l\alpha}$ and $C_{l\beta}$ are thin airfoil theory section lift curve slopes as a function of angle of attack, $\alpha$, and flap deflection angle, $\beta$, respectively. $C_{lt\alpha}$, $C_{mt\alpha}$ and $C_{lt\beta}$, $C_{mt\beta}$ are thin airfoil theory flap element lift-curve and moment-curve slopes as a function of angle of attack, $\alpha$, and tab deflection angle, $\beta$, respectively. A simple finite wing aspect ratio correction was also incorporated into these coefficients. (The referenced aerodynamic coefficients, and their application as discussed here are well know to those skilled in the art. See, for example, Perkins, C. D., and Hage, R. E., *Airplane Performance, Stability and Control*, John Wiley, New York, N.Y., 1949, and Hoerner, S., *Fluid Dynamic Lift*, Fluid Dynamics, Bakersfield, Calif., 1985.) A first approximation to the structural damping was incorporated into this model for analysis of "living hinge" designs using an equivalent viscous damping term with coefficients $\gamma_1$ and $\gamma_2$, corresponding to $\theta$- and $\beta$-motion structural damping, respectively. The resulting system is a function of the variables listed in TABLE 1. The first two are dependent variables and the rest are independent variables.

TABLE 1

Dynamic Model Parameter Definitions

| Variable | Definition |
|---|---|
| $\theta$ | Root hinge deflection angle |
| $\beta$ | Tab hinge deflection angle |
| t | Time |
| U | Free-stream velocity ($U_\infty$) |
| $\alpha$ | Geometric angle of attack |
| $\rho$ | Air density |
| $x_h$ | Axial location of tab hinge (from leading edge of flap) |
| c | Chord of flap |
| R | Span of flap (that is, flap height b; see FIGS. 4-6) |
| $I_{xx}$ | Moment of inertia of flap/tab about x-axis |
| $I_{yy}$ | Moment of inertia of tab about y-axis |
| $I_{xy}$ | Moment of inertia of tab about x- & y-axes |
| $\theta_s$ | Activation angle for root hinge second displacement region |
| $\beta_s$ | Activation angle for tab hinge second displacement region |
| $\gamma_1$ | Root hinge structural damping coefficient |
| $\gamma_2$ | Tab hinge structural damping coefficient |

The set of coupled equations given above were solved for $\theta$ and $\beta$ as functions of time t. (In the computer program used to solve the equations, the model was given a small initial angular velocity for both the root hinge and the flap hinge.) The program evolved the equations in time until a periodic steady state solution was obtained or the solution damped to some equilibrium position. This dynamic simulation model was used to design a nominal 3" chord and 3" span flap configuration like that shown in FIGS. 7-9, for the purpose of predicting the nature of sustained flap oscillation in low-speed wind tunnel tests (maximum available $U_\infty$ of roughly 120 ft./sec.). An important design consideration was to demonstrate that oscillatory vortical structures can be introduced having a wavelength much larger than the flap chord, as distinguished from classical flutter phenomena where $\lambda/c \approx O(1)$. As discussed above, a preferred application of the invention provides $\lambda/c \approx O(10\text{-}100)$.

To demonstrate the present invention using the two-degree of freedom model discussed above, a flap was modeled having the design characteristics shown in TABLE 2. The goal was to identify a design that demonstrated the operation of an embodiment of the invention within the speed constraints of the wind tunnel available for actual testing. No effort was made to optimize this configuration.

TABLE 2

Demonstration Model Design Specifications

| Parameter | Value |
|---|---|
| U | 120 ft/sec |
| $\alpha$ | about 0 degrees |
| $\rho_p$ | 1.72 slug/ft$^3$ |
| $x_h$ | 2 in. |
| c | 3 in. |
| R | 3 in. |
| $I_{xx}$ | 3.53 × 10$^{-5}$ sl-ft$^2$ |
| $I_{yy}$ | 1.31 × 10$^{-6}$ sl-ft$^2$ |
| $I_{xy}$ | 2.94 × 10$^{-6}$ sl-ft$^2$ |
| $K_{f1}$ | 3.5 × 10$^{-2}$ sl-ft$^2$/rad |
| $K_{f2}$ | 0.17 sl-ft$^2$/rad |
| $K_{t1}$ | 8.2 × 10$^{-3}$ sl-ft$^2$/rad |
| $K_{t2}$ | 0.35 sl-ft$^2$/rad |
| $\theta_s$ | 6 degrees |
| $\beta_s$ | 25 degrees |
| $\gamma_1$ | 4.8 × 10$^3$ sec$^{-1}$ |
| $\gamma_2$ | 7.0 × 10$^3$ sec$^{-1}$ |

Figure 11:
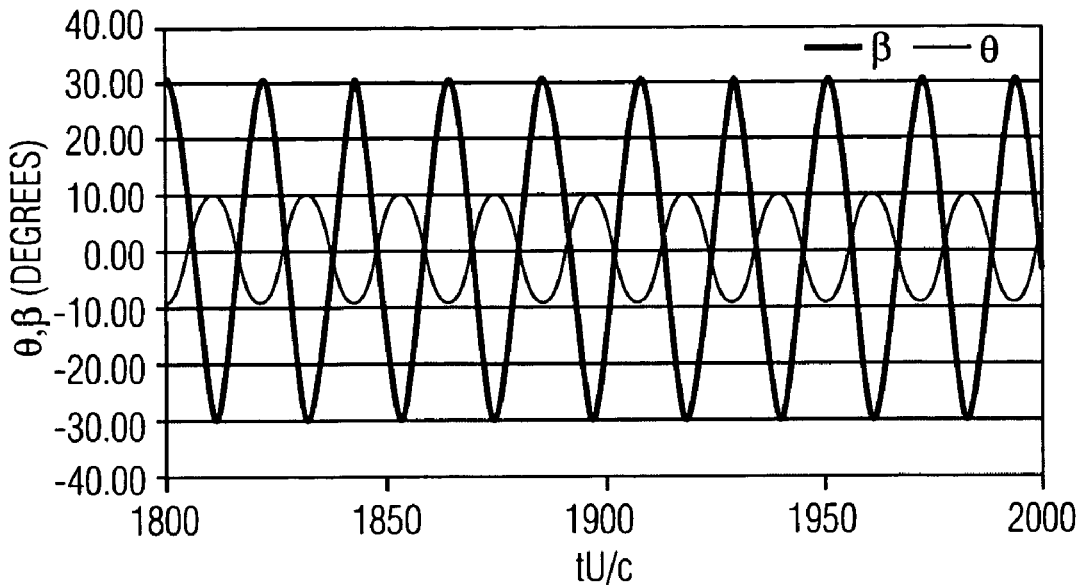
FIG. 11 plots the deflection angles $\theta$ and $\beta$ of the spring hinges as a function dimensionless time tU/c at a flow speed U=120 ft./sec. (c=flap chord), as predicted by a mathematical model of a vortex generator in accordance with FIG. 10.

FIG. 11 presents a dynamic simulation for this configuration with a free-stream velocity of 120 ft./sec., showing the deflection angles $\theta$ and $\beta$, as a function of non-dimensional time (tU/c). The computer predicts a flap oscillation frequency $f_o$ of 23.4 cycles per second, which corresponds to a wavelength for the vortex structures (see FIG. 2) of $\lambda/c=20.5$, calculated as follows:

$$\lambda/c = V_\infty/(c \cdot f_o) = (1/23.4 \text{ cycles/sec.}) \times (120 \text{ ft./sec.}) \times (1/3 \text{ in.}) \times (12 \text{ in./1 ft.}) = 20.5$$

This frequency of oscillation falls well within the target design range of $\lambda/c = O(10\text{-}100)$. The predicted amplitude of motion of the root hinge is $\pm 10°$ and the tab hinge is $\pm 30°$. FIG. 11 shows the oscillation of the main portion and tab portion as 180° out of phase only because of the sign convention used in the analysis. This enables the two oscillation modes to be more clearly seen in FIG. 11, but it should be understood that the computer simulation actually predicts that the two portions oscillate in phase with each other.

Figure 12:
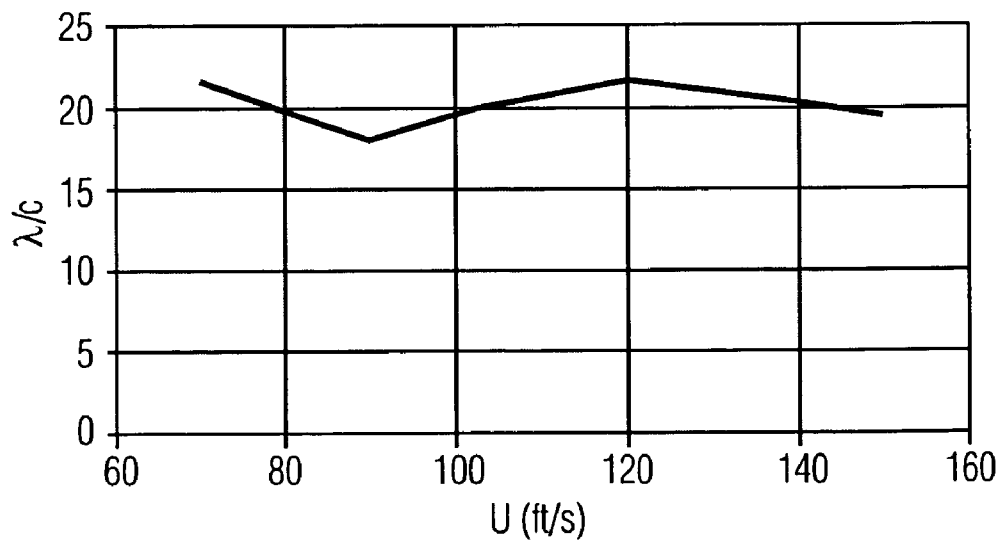
FIG. 12 plots the dimensionless wavelength ($\mu/c$) of the vortex structures generated by the same mathematical model, as a function of the flow speed.

FIG. 12 shows that the predicted $\mu/c$ values are essentially independent of flow speed U. (In FIGS. 11 and 12, "U" is the same as $U_\infty$ in the preceding discussion.) This is an important feature of the present invention, particularly for aircraft applications, since it will provide the advantages of the invention discussed above at different flight speeds. For example, the effects on acoustic resonance associated with a weapons bay will be ameliorated for missile release at different flight speeds. In addition, oscillations decay to zero within about 2 seconds when the free-stream velocity is less than the flutter-onset flow speed of 67 ft./sec. (determined by solving the coupled equations at different velocities to find the lowest velocity at which sustained oscillation occurs). Designing the flap so that the oscillations decay to zero below certain flow velocities means that the flap will oscillate only when needed, thus minimizing the number of oscillations that each hinge undergoes during the life of the flap and extending flap life. The number of lifetime oscillations of the flaps can also be limited by deploying the flaps only when they are needed, using a deploying mechanism that operates to stow and deploy the flaps in a manner like that shown in FIGS. 16 and 17.

Wind Tunnel Tests

Figure 13:
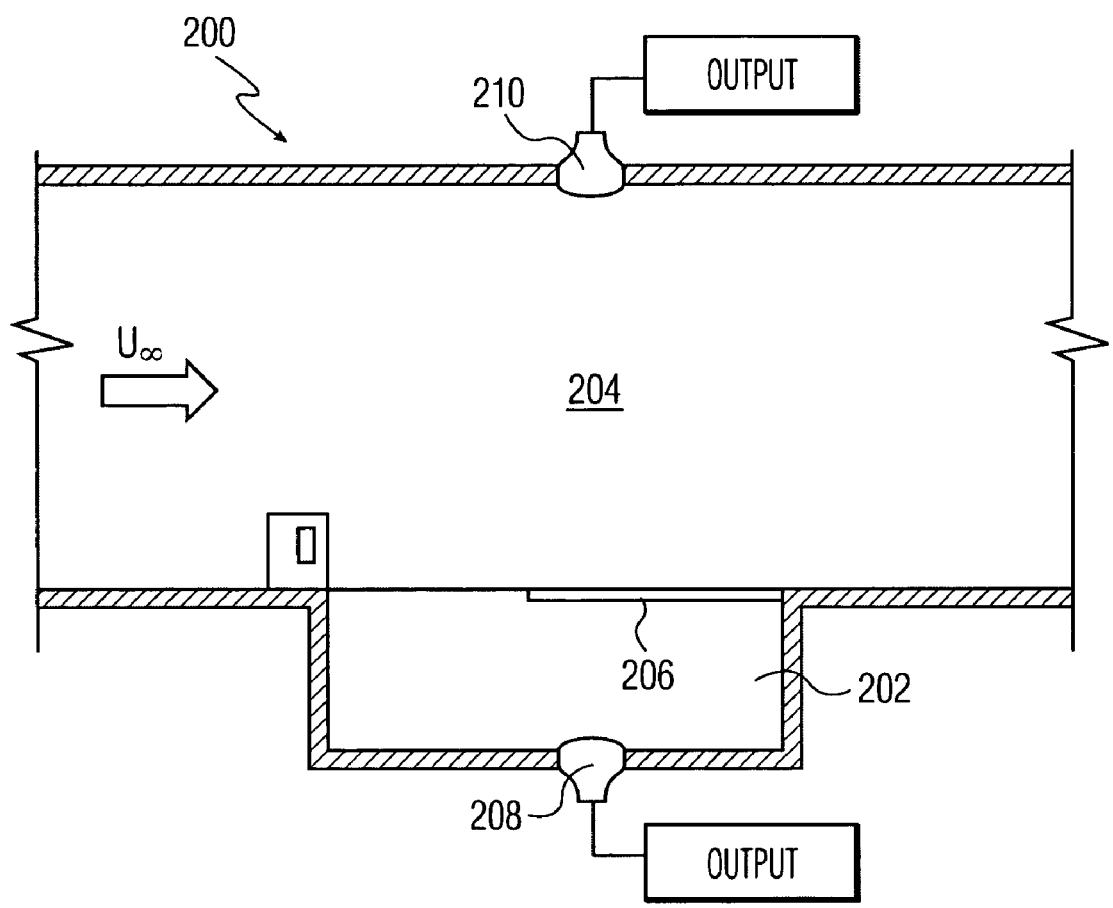
FIG. 13 is a cross-section view of a wind tunnel set-up for demonstrating the efficacy of the present invention.
Figure 14A:
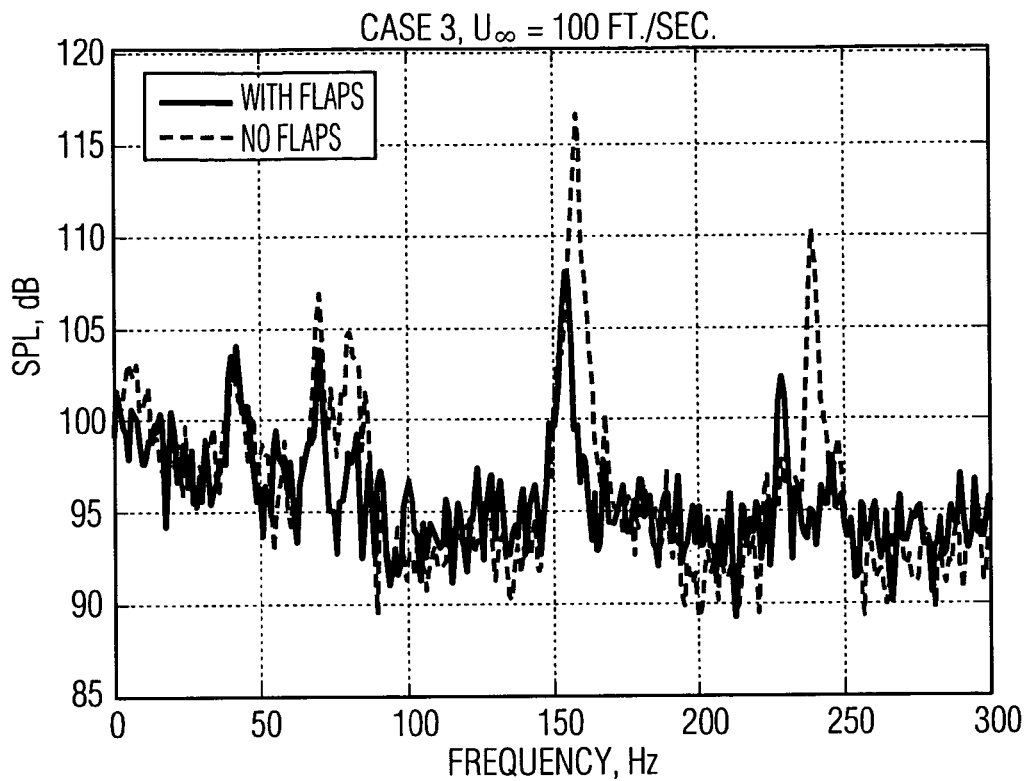
FIG. 14, comprising FIGS. 14A, 14B, 14C, and 14D, plots the sound pressure level as a function of frequency at various flow speeds for one embodiment of the invention.
Figure 14B:
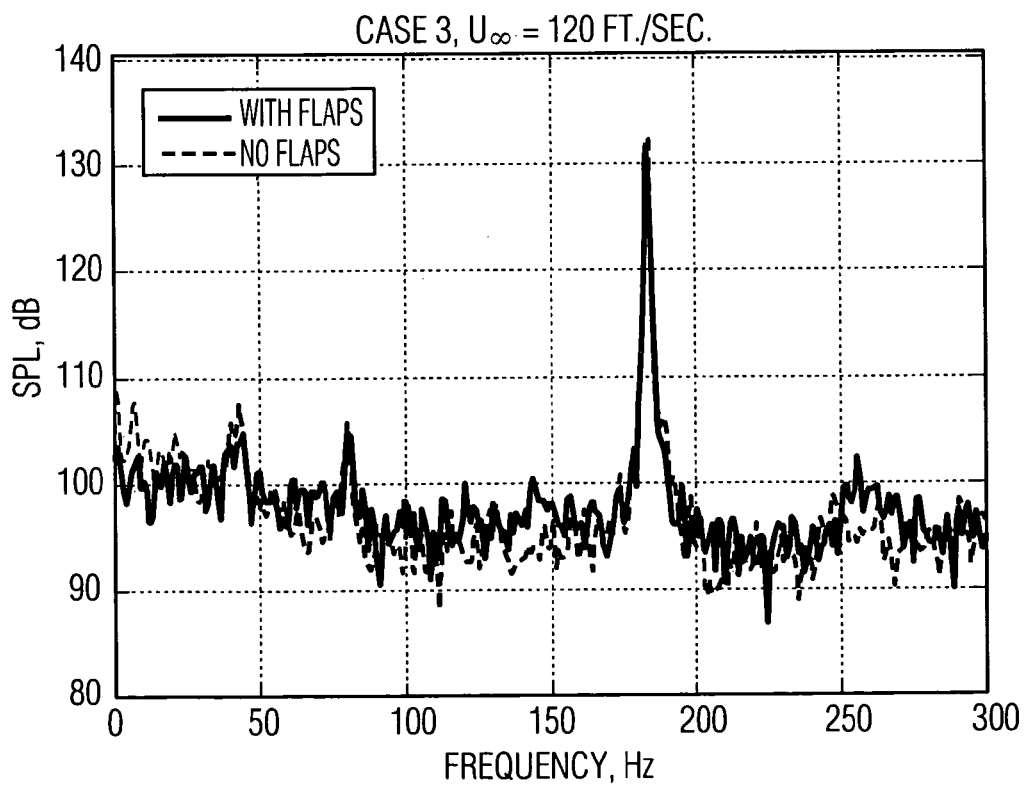
Figure 14C:
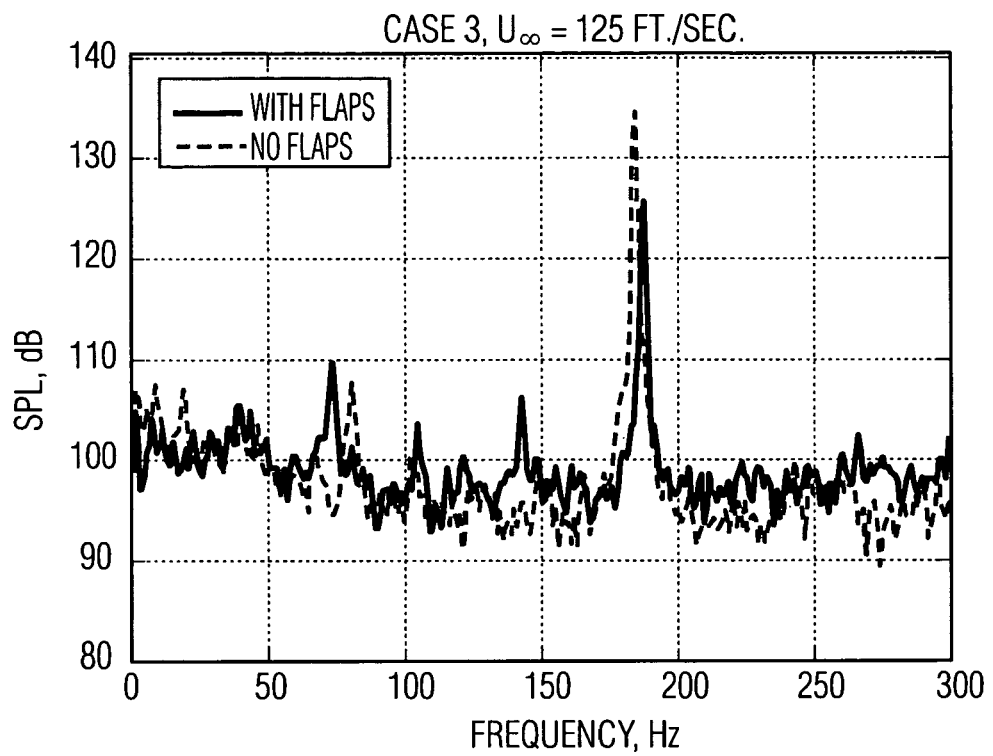
Figure 14D:
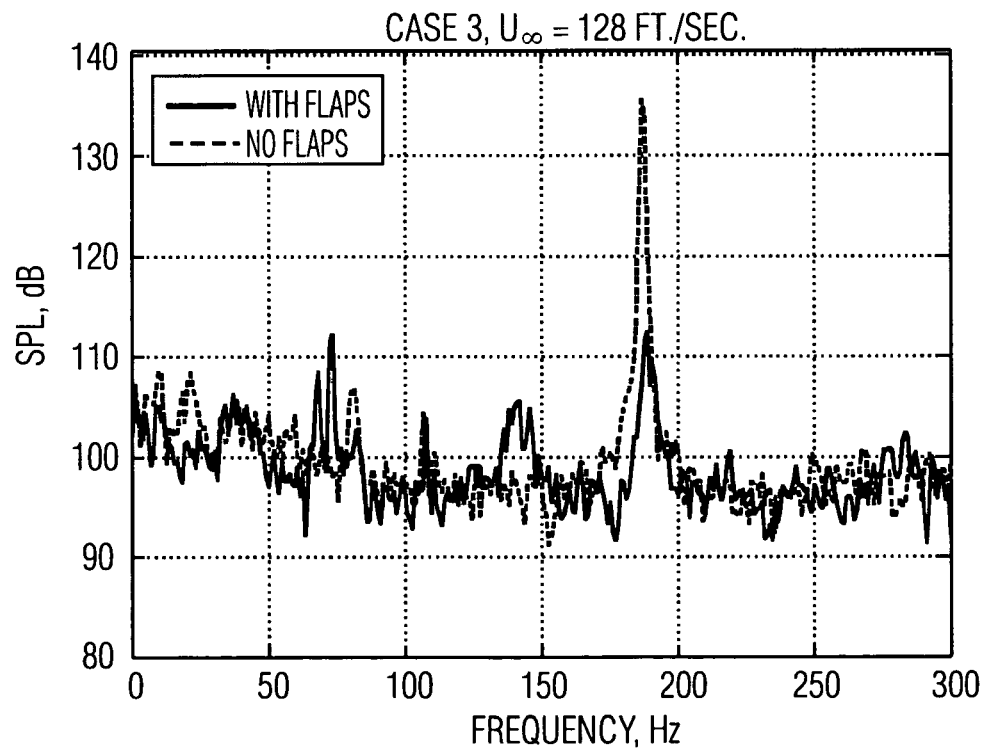
Figure 15A:
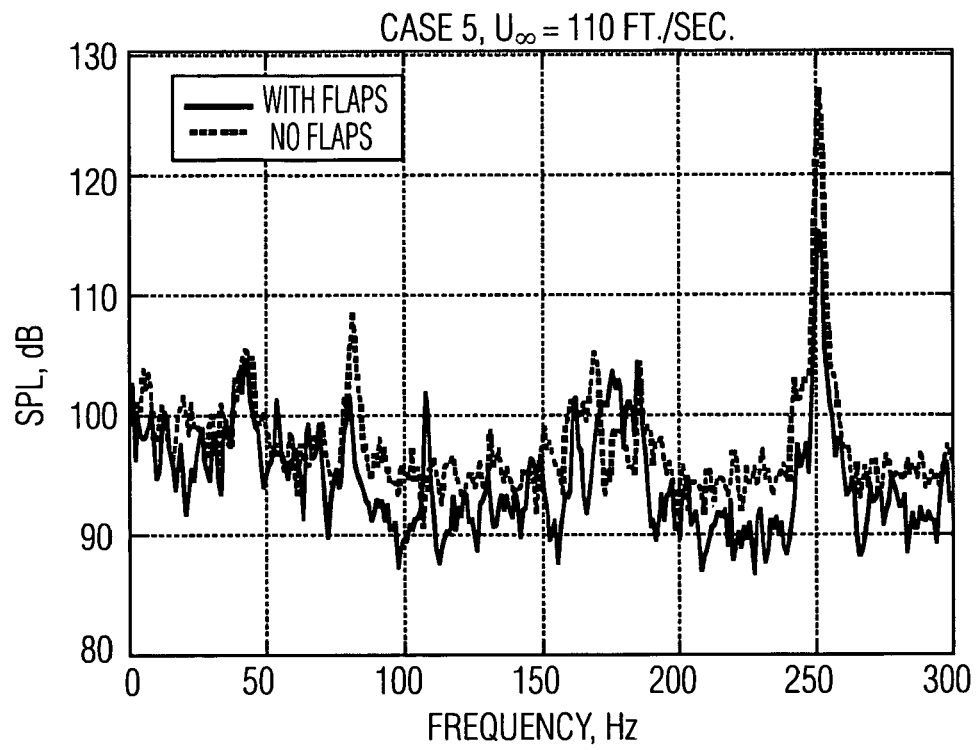
FIG. 15 comprising FIGS. 15A, 15B, 15C, and 15D, plots the sound pressure level as a function of frequency at various flow speeds for another embodiment of the invention.
Figure 15B:
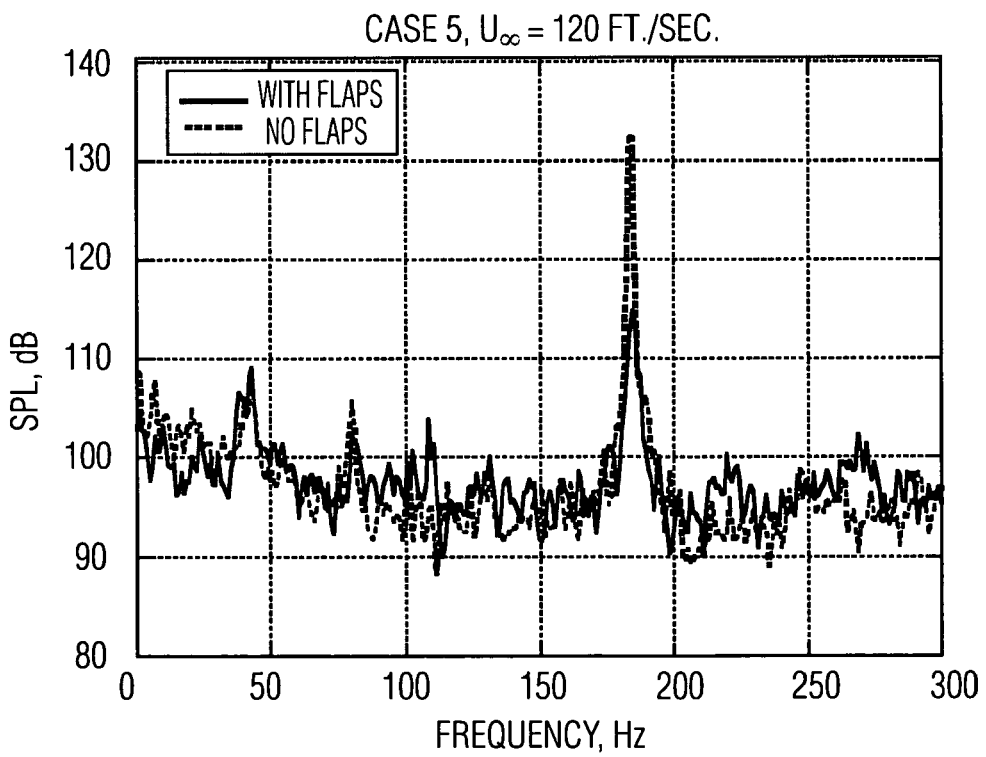
Figure 15C:
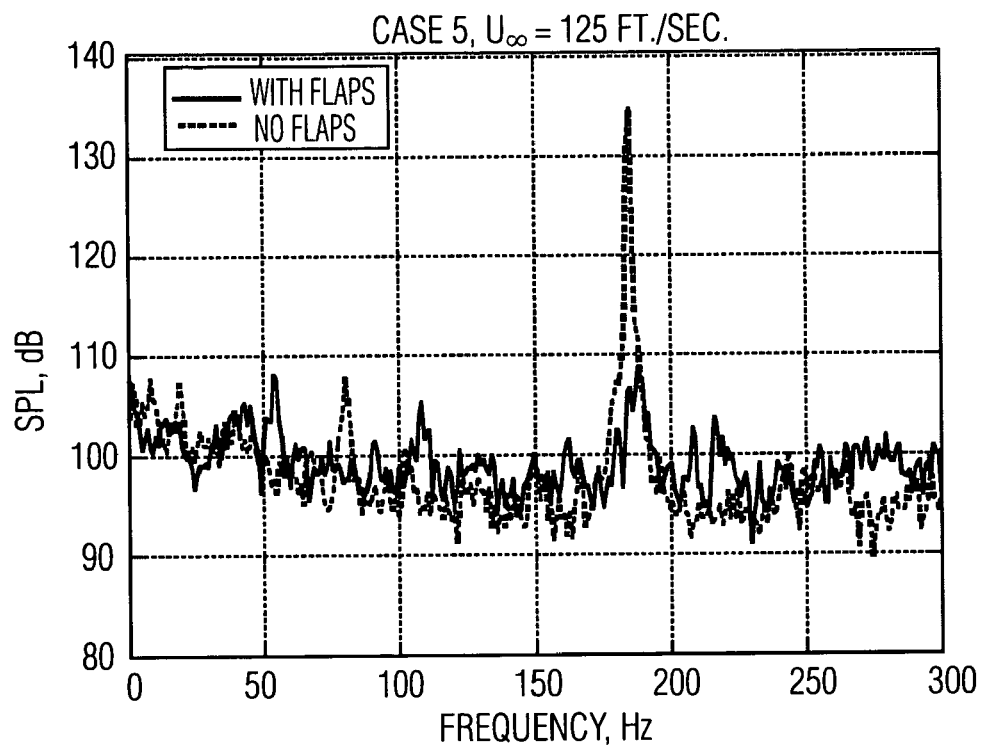
Figure 15D:
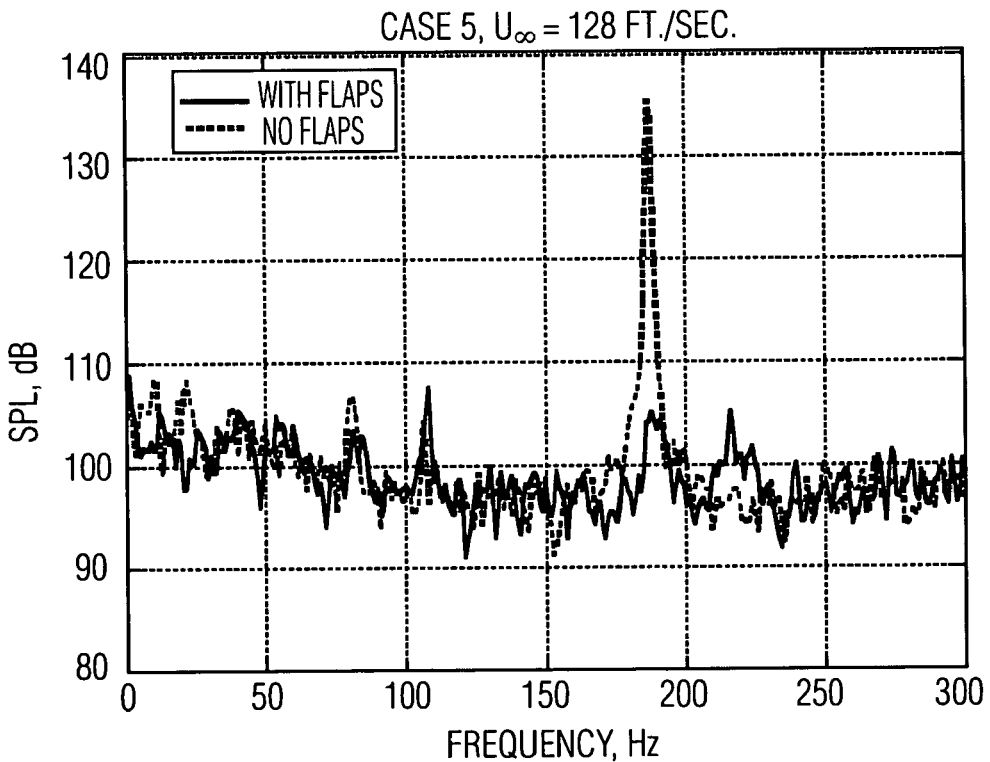

To demonstrate the viability of flow driven oscillating vortex generators for cavity flow control, preliminary tests were conducted using sample flap designs based on the above principles. Despite not being optimized, the devices tested produced promising initial results, discussed below. These experiments were performed in a low-speed wind tunnel comprising an open-loop suction driven facility designed for low turbulence operation with a nominal 1 ft.×1 ft. test section and operating speeds in a range of 50-130 ft/sec. The cavity (simulating an aircraft weapons bay or landing gear well, for example) was made of plastic and reinforced with aluminum angles and mounted on a side of the test section. FIG. 13 is a cross-section of the wind tunnel 200 used in the tests, having a cavity 202 attached to the wind tunnel test section 204. The cavity was 16" long×13" wide×8" deep. The cavity was partially covered by a movable lid 206 that enabled the effective length of the cavity to be changed according to the conditions desired for a particular test. For the tests reported here, the cavity length was set to 8", which was the cavity length at which the cavity resonated for the maximum $U_\infty$ of the wind tunnel used in the tests This maximized the sound pressure levels produced by cavity resonance. In summary, the cavity dimensions for the test were W=13", H=8", and L=8" (see FIGS. 4-6).

Although this testing was performed at low speeds (Mach<0.2), the fundamental mechanisms being explored are similar in a high speed case. This is because the vorticity introduced by the flaps is predominantly in the downstream direction so that, provided cross-flow components are low, the low speed case should fairly represent the flow characteristics at higher speeds. This assumption is justified by the routine and successful application of incompressible vortex wake models to study of high speed aircraft wakes. Good agreement with experiment is obtained for transonic and even supersonic vehicles, provided that cross-flow Mach numbers remain in the low subsonic regime.

As seen in FIG. 13, the test set up was equipped with two pressure transducers 208 and 210 for measuring pressure fluctuations. The first transducer 208 was located inside the cavity in the center of the cavity flow, and the second transducer 210 was mounted on the opposite side of the wind tunnel test section. Pressures both in the cavity (transducer 208) and in the test section (transducer 210) were compared with outside atmospheric pressure and time histories acquired for generation of frequency spectra. No special post-processing, filtering or smoothing was performed; the plots in FIGS. 14 and 15 focus on the frequency range up to 300 Hz, and the dB level was calculated using a reference level of $2.9 \times 10^{-9}$ psi. The following test configurations were considered:

(1) no cavity,
(2) cavity installed,
(3) "small" flaps with $\phi=30°$ (FIG. 6) and $\alpha=0°$ (FIG. 9), the results for which are plotted in FIG. 14,
(4) small flaps with $\phi=90°$ and $\alpha=0°$, and
(5) "large" flaps with $\phi=90°$ and $\alpha=0°$, the results for which are plotted in FIG. 15.

For the small flaps, c=1" and b=1", and the second cutout measured 0.625"×0.25". For the large flaps, c=1.5" and b=1.5", and the second cutout measured 0.75"×0.375". The different flap sizes were designed to begin oscillating at different flow speeds. The small flaps were designed for oscillation onset at about 120 ft./sec., and the large flaps were designed for oscillation onset at about 100 ft/sec.

Test results with no cavity (case 1) showed that contributions from the wind tunnel driving motor and fan produce peak sound pressure levels at frequencies of about 40 Hz. Background noise did not vary significantly with wind tunnel speed and corresponded to levels of about 95-100 dB for all frequencies, except for the tunnel fan, which produced a peak of about 108 dB around 45 Hz. When the cavity 202 was installed without flaps (case 2), the pressure transducer 208 inside the cavity showed no resonant behavior at low speeds of 50 ft./sec. At about 70 ft./sec. the frequency spectrum showed resonant peaks, although still at levels lower than the background motor noise. At wind tunnel speeds of 80 ft./sec., a pronounced and audible tonal resonance was established, in the nature of an increase of approximately 30 dB in the frequency component sound pressure level at this speed. Further increases of wind tunnel speed led to increased noise levels, and at speeds higher than 120 ft./sec., a resonant mode with a sound pressure level of about 135 dB was established at approximately 186 Hz. Overall, the resonant frequencies compared well with predictions of Rossiter's formula for frequency $f_n=(U/L)[(n-\gamma)/(U/c+1/k)]$, where U is flow speed (that is, $U_\infty$), L=0.67 ft. (length of the cavity opening), c=112 ft./sec. (acoustic speed in air), and $\gamma=0.25$ and k=0.61 (free constants with typical values as suggested in technical literature).

In all three of the configurations tested (cases 3-5 above), four equally spaced flaps were located at the leading edge of the cavity (with equal spaces at either end of the array). This provided an array 7.5" wide, spaced 2.75" from either side wall of the cavity and 2.5" from each other. For the small (1"×1") flaps, the pitch p/b (FIG. 6) was 2.5 (2.5"/1"), and for the large (1.5"×1.5") flaps, the pitch p/b was 1.67 (2.5"/1.5").

The small flaps, designed to begin oscillating at a flow speed of 120 ft./sec, actually began oscillating marginally at approximately 110 ft./sec., and by 120 ft./sec. oscillation was fully developed for all four flaps. At lower speeds the devices did not oscillate and worked as non-oscillating "vane" vortex generators. Although at lower speeds the noise level was reduced, only the results for higher speeds are shown in the accompanying figures in order to quantify the effect of flow-actuated oscillating flaps. The results of the tests for case 3 above ($\phi=30°$) are plotted in FIGS. 14A to 14D. The flow velocity was increased and noise level at resonant frequencies was reduced. FIG. 14 shows that increasing speed leads to larger oscillation amplitude and larger reductions in resonant tone. Tonal sound pressure level reduction varied with speed from a few dB at 120 ft./sec. to more than 20 dB at 128 ft./sec.

The next test (case 4) involved the same flaps mounted normal to the wall ($\phi=30°$). The tests showed up to 15 dB reductions in tonal sound pressure levels regardless of flow speed as soon as the flaps began oscillating.

In the last test (case 5), the large 1.5"×1.5" flaps began to oscillate at flow velocities of 100 ft./sec., and at 120 ft./sec. all of the flaps were oscillating. Significant tonal sound pressure level reductions, up to 25-30 dB, were observed at flow speeds of 125 ft./sec. and 128 ft./sec., flow speeds at which all of the flaps were fully oscillating. The frequency of self-excited oscillations slightly depends on flow speed and is in the 20-30 Hz range, corresponding to a reduced frequency 1.3-1.9 based on cavity opening length. "Reduced frequency"

is defined as $\omega L/U_\infty$ (where $\omega$=frequency of oscillation in radians/sec., L=cavity length in inches, and $U_\infty$=free-steam flow velocity in feet/sec.). As is well known to those skilled in the art, "reduced frequency" is a non-dimensional parameter that allows comparison between cases at different physical scales and different flow speeds. That is, successful attenuation for a reduced frequency range of 1.3-1.9 for the case actually tested indicates that the same attenuation characteristics would result for cases with different flow speeds and/or cavity lengths in the same reduced frequency range.

The frequency spectra shown in FIGS. 14 and 15 establish the success of the present invention in reducing resonant cavity tones. These tests also showed that generally the flaps themselves do not become strong acoustic radiators, in that the tests showed that the extra noise produced by the oscillating flaps is small compared to the background level and especially to tonal resonant peaks.

Another way to estimate the noise level in the cavity is to compute overall sound pressure level by summing the squared harmonic amplitudes and converting the result to dB (with a reference of $2.9 \times 10^{-9}$ psi). TABLE 3 summarizes overall sound pressure levels for cases 1-5 above.

TABLE 3

Overall Cavity Sound Pressure Levels for Cases 1 to 5

| Flow speed, ft./sec. | OSPL, dB no cavity (case 1) | OSPL, dB no flaps (case 2) | OSPL, dB small flaps $\phi = 30°$ (case 3) | OSPL, dB small flaps $\phi = 90°$ (case 4) | OSPL, dB large flaps $\phi = 90°$ (case 5) |
|---|---|---|---|---|---|
| 110 | 123.0 | 131.2 | n/a | 124.7 | 123.8 |
| 120 | 123.1 | 136.0 | 133.5 | 127.0 | 125.8 |
| 125 | 124.4 | 137.5 | 130.2 | 129.7 | 126.6 |
| 128 | n/a | 138.5 | 126.5 | 129.1 | 126.1 |

In summary, the tests showed that the flaps comprising the above-discussed embodiment of the invention are capable of producing large disturbances in the incoming flow, thus disrupting the Rossiter coupling mechanism responsible for cavity resonance. Accordingly, flow driven oscillating vortex generators in accordance with the present invention will mitigate cavity resonance, without requiring external power.

Embodiment of a Deploying Mechanism

Figure 16:
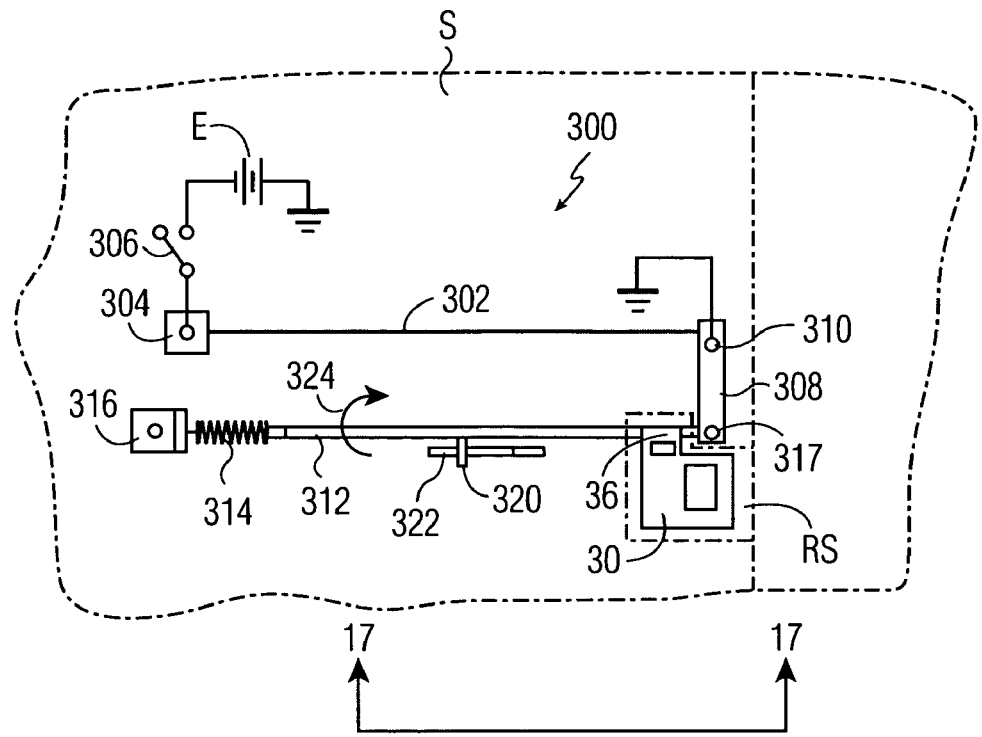
FIG. 16 is a schematic depiction of an embodiment of a deployment mechanism in accordance with the present invention.

FIG. 16 is a schematic top view of an embodiment of a flap deployment mechanism 300 in accordance with another aspect of the present invention. The mechanism 300 is housed beneath the surface (denoted at S), which is depicted in phantom form in FIG. 16 to render the mechanism visible. There is a separate mechanism 300 for each flap 30 in the array shown in FIG. 4. Since the individual deployment mechanisms are identical, only one is described herein in detail.

A shape-memory alloy (SMA) wire 302 is secured at one end to an anchor 304 that is connected to a source of direct electrical current E through a switch represented schematically at 306. The other end of the SMA wire 302 is connected to the proximal end of a pivot arm 308 that pivots about a pivot point 310. The pivot arm is grounded so that when the switch 306 is closed, electrical current flows through the SMA wire. A rigid shaft 312 is secured at its distal end to a spring 314 that in turn is mounted to a fixed bracket 316. The proximal end of the shaft 312 is secured to the distal end of the pivot arm 308 at a pivot point 317. The SMA wire is made of a suitable material such as a 0.015" diameter wire made of Nitinol (a 50/50 alloy of nickel and titanium) that contracts when a voltage is applied across it. Contraction of the SMA wire 302 thus causes the pivot arm 308 to pivot counterclockwise as seen in FIG. 16, thus moving the shaft 312 axially towards the right (arrow 313 in FIG. 17) as seen in FIG. 16, against the force of the spring 314. A camming pin 320 is attached to the shaft 312, and a ramp 322 is disposed to cooperate with the camming pin, which moves along the ramp 322 placed in its path as the shaft moves to the right. As the shaft moves to the right, the camming pin causes it to rotate in the direction of the arrow 324.

Figure 17:
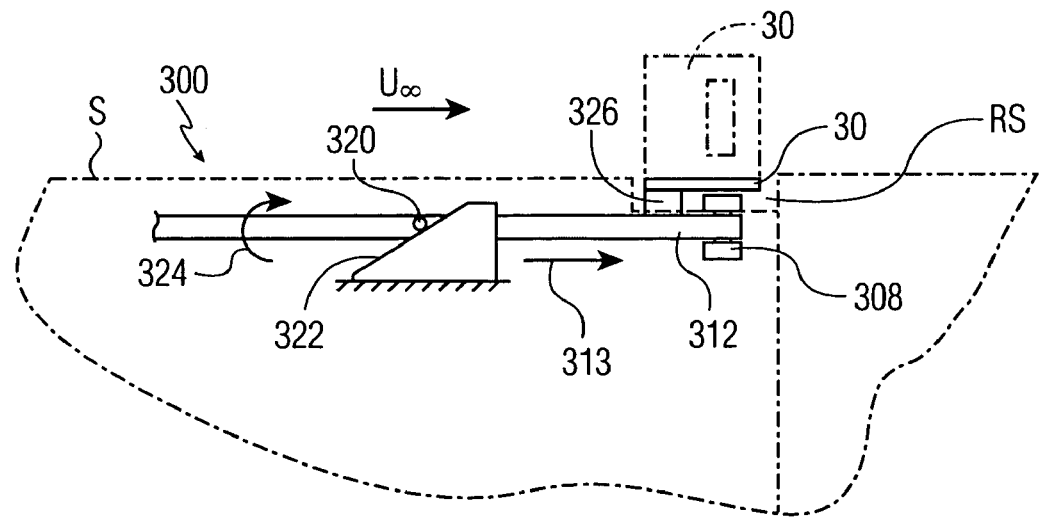
FIG. 17 is a partial side view of the deployment mechanism taken at lines 17-17 of FIG. 16.

FIG. 17 is an enlarged side view taken at lines 17-17 of FIG. 17 to show the details of the attachment of the flap 30 to the shaft 312, and the manner in which the flap is moved between its operative position (shown in dotted lines in FIG. 17) and its stowed position (shown in solid lines in FIG. 17). The shaft 312 has a mounting plate 326 secured to it by suitable means such as soldering or welding. The root 36 of the flap is, in turn, soldered or welded to the mounting plate 326. The mounting plate maintains the flap flush with the surface S when the flap is in its stowed position. The stowed flap is located in a recess RS in the surface. Rotation of the shaft 312 by the camming pin 320 causes the flap 30 to rotate in the direction of the arrow 324.

To deploy the flap 30 to some non-zero deployment angle $\phi$, the switch 306 is closed to apply a DC voltage to the SMA actuating wire 302, which contracts and causes the pivot arm to pivot counterclockwise (as seen in FIG. 16) about the pivot point 317, thus moving the shaft 312 axially to the right. This causes the shaft to rotate in the direction of the arrow 324 via the interaction between the camming pin 320 and the ramp 322 and deploy the flap 30 as seen in dotted lines in FIG. 17. It will be appreciated that the flap 30 covers the recess RS when the flap is stowed, thus presenting a virtually continuous surface that largely eliminates any aerodynamic drag that might otherwise be associated with the installation of the flaps on an aircraft fuselage. In addition, the root portion 36 of the flap is dimensioned so that the first cutout 39 is just below the level of the surface when the flap is deployed. This locates the first hinge at the surface for optimum acoustic attenuation with this flap embodiment.

It will be appreciated that other deployment mechanisms could be used and that the mechanism depicted in FIGS. 16 and 17 is simply one example of a mechanism that can move the flap to a non-zero angle q) relative to the surface. Since it is within the scope of the invention to deploy an array of flaps above and oriented parallel to the surface ($\phi=0°$), it is likewise within the scope of the invention to provide a deployment mechanism that moves each flap from a stowed position like that shown in FIG. 17 to such a deployed position. In such an embodiment, the deployment mechanism could hold the flap in a position spaced above the surface for oscillation about a hinge proximate to the flap leading edge and parallel to the surface.

SUMMARY AND CONCLUSION

An important aspect of the present invention entails applying flow driven oscillating vortex generators to control cavity flow. These devices offer a number of advantages over previous mechanisms for cavity flow resonance mitigation as summarized in TABLE 4. In addition to being self-powered, they can produce self-excited oscillations of large amplitude comparable to the device dimensions, unlike previous oscillatory flaps involving small deflections. TABLE 4 summarizes some of the more significant advantages of some of the aspects of the present invention over various prior art approaches discussed above.

TABLE 4

Advantages of Flow Driven Oscillating Vortex Generators

| Property | Comments |
| --- | --- |
| No power source required | Energy is extracted from the flow, thus eliminating the cost and weight penalties of auxiliary power sources |
| Large amplitude oscillations | Flow perturbations, considerably larger than for previous mechanical devices, are available for accentuating shear layer mixing/energizing and for introducing 3-D flow variations |
| Flush installation | No drag penalties in stowed configuration, which also reduces lifetime fatigue of the device |
| Actuation on demand | Devices are engaged only when needed |

It will be understood that the embodiments of the invention described above can be modified in myriad ways without departing from the scope of the invention. For example, the flap can assume shapes different from the flap 30 shown in FIGS. 7-9, one such modification being to provide a flap with a swept, tapered, or swept/tapered shape rather than the planform shown in FIG. 7. Another example of a modification within the scope of the invention is the use of electromechanical or electromagnetic actuation for deploying the inventive flow-driven acoustic attenuator rather than the SMA-actuated mechanism described above.

Those skilled in the art will readily recognize that only selected preferred embodiments of the invention have been depicted and described, and it will be understood that various changes and modifications can be made other than those specifically mentioned above without departing from the spirit and scope of the invention, which is defined solely by the claims that follow.

What is claimed is:

1. Apparatus for attenuating acoustic resonance generated by flow over a surface with a cavity therein, the apparatus comprising:

a plurality of flaps proximate to the cavity at an edge thereof upstream in the direction of the flow, said flaps being disposed in an array spaced in a width direction of said upstream edge; and a mounting arrangement for mounting each said flap for oscillation relative to the flow, wherein each said flap is constructed to oscillate with two degrees of freedom and the oscillation of each said flap is driven solely by the flow independent of an actuation mechanism.

2. Apparatus as in claim 1, wherein each said flap is a flat sheet mounted at an angle of attack $\alpha=-20°$ to $+20°$ relative to the direction of the flow over the surface and at an angle $\phi=10°$ to $90°$ relative to said surface.

3. Apparatus as in claim 2, wherein $\phi$ is preferably between $20°$ to $45°$, and $\alpha$ is preferably between $-5°$ and $+5°$.

4. Apparatus as in claim 3, wherein $\alpha=0°$.

5. Apparatus as in claim 1, wherein each said flap includes a first hinge generally coextensive with said surface for enabling oscillation in a first degree of freedom and a second hinge orthogonal to said first hinge and forming a tab for enabling oscillation in a second degree of freedom.

6. Apparatus as in claim 5, wherein each of said first and second hinges has at least one predetermined torsional spring constant for a given range of angular deformation to provide a desired magnitude and frequency of oscillation when driven by the flow.

7. Apparatus as in claim 6, wherein:

each said flap is a flat sheet having a leading edge and a trailing edge and a chord length c between said leading and trailing edges; and said torsional spring constants provide a frequency of oscillation $f_o$ in both degrees of freedom at a flow velocity $V_\infty$ over said surface, such that $V_\infty/(c \cdot f_o)=O(10\text{-}100)$.

8. Apparatus as in claim 1, wherein:

each said flap is a flat sheet having a leading edge and a trailing edge and a chord length c between said leading and trailing edges; and each said flap is configured to oscillate at a frequency $f_o$ at a flow velocity $V_\infty$ over said surface, such that $V_\infty/(c \cdot f_o)=O(10\text{-}100)$.

9. Apparatus for attenuating acoustic resonance generated by flow over a surface with a cavity therein, the apparatus comprising:

a plurality of flat flaps proximate to the cavity at an edge thereof upstream in the direction of the flow, said flaps being disposed in an array spaced in a width direction of said upstream edge;

a mounting arrangement for mounting each said flap for oscillation relative to the flow, wherein each said flap is constructed to oscillate with two degrees of freedom and the oscillation of each said flap is driven solely by the flow independent of an actuation mechanism; and a deployment mechanism for moving each said flap between a stowed position wherein said flap is generally flush with said surface and a deployed position wherein each said flap is disposed at a position for oscillation by the flow.

10. Apparatus as in claim 9, wherein:

each said flap when in said deployed position is oriented at an angle of attack $\alpha=-5°$ to $+5°$ relative to the direction of the flow over the surface and at an angle $\phi=10°$ to $90°$ relative to said surface;

each said flap includes a first hinge generally coextensive with said surface when said flap is in said deployed position, said first hinge enabling oscillation in a first degree of freedom, and a second hinge orthogonal to said first hinge and forming a tab for enabling oscillation in a second degree of freedom; and each of said first and second hinges has at least one predetermined torsional spring constant for a given range of angular deformation to provide a desired magnitude and frequency of oscillation when driven by the flow.

11. Apparatus for attenuating acoustic resonance generated by flow over a surface, the apparatus comprising:

at least one flap disposed for presenting a leading edge to the flow; and a mounting arrangement for mounting said flap for oscillation transverse to the direction of the flow, wherein said flap is constructed to oscillate with two degrees of freedom and the oscillation of said flap is driven solely by the flow independent of an actuation mechanism.

12. Apparatus as in claim 11, further comprising a plurality of said flaps spaced from each other in an array disposed transverse to the direction of the flow.

* * * * *